United States Patent
Ullrich et al.

(10) Patent No.: US 9,786,173 B2
(45) Date of Patent: Oct. 10, 2017

(54) DYNAMIC ROUTING OF TRANSIT VEHICLES

(71) Applicants: Oliver Ullrich, Langenfeld (DE); Naphtali Rishe, Miami Beach, FL (US); Daniel Luckerath, Cologne (DE)

(72) Inventors: Oliver Ullrich, Langenfeld (DE); Naphtali Rishe, Miami Beach, FL (US); Daniel Luckerath, Cologne (DE)

(73) Assignee: The Florida International University Board of Trustees, Miami, FL (US)

( * ) Notice: Subject to any disclaimer, the term of this patent is extended or adjusted under 35 U.S.C. 154(b) by 101 days.

(21) Appl. No.: 14/829,021

(22) Filed: Aug. 18, 2015

(65) Prior Publication Data

US 2017/0053531 A1    Feb. 23, 2017

(51) Int. Cl.
| | | |
|---|---|---|
| G08G 1/133 | (2006.01) |
| G06Q 10/04 | (2012.01) |
| G08G 1/127 | (2006.01) |
| G08G 1/01 | (2006.01) |
| G08G 1/0968 | (2006.01) |

(52) U.S. Cl.
CPC ....... *G08G 1/096811* (2013.01); *G06Q 10/04* (2013.01); *G08G 1/096822* (2013.01); *G08G 1/096844* (2013.01); *G08G 1/127* (2013.01); *G08G 1/133* (2013.01); *G08G 1/012* (2013.01); *G08G 1/0112* (2013.01); *G08G 1/0116* (2013.01); *G08G 1/0145* (2013.01)

(58) Field of Classification Search
CPC ........... G08G 1/096811; G08G 1/0125; G08G 1/133; G08G 1/202; G08G 1/0104; G08G 1/0129; G08G 1/0137; G08G 1/048; G08G 1/09; G08G 1/0967; G08G 1/0968–1/096805; G08G 1/096833; G08G 1/096877–1/096894; G08G 1/123
USPC ....... 701/117, 410, 411, 414, 415, 416, 423, 701/465; 700/28, 32
See application file for complete search history.

(56) References Cited

U.S. PATENT DOCUMENTS

| | | | | |
|---|---|---|---|---|
| 6,006,159 | A  * | 12/1999 | Schmier | G08G 1/123 340/988 |
| 8,886,453 | B2 * | 11/2014 | Cerecke | G01C 21/3446 701/422 |
| 2002/0069017 | A1* | 6/2002 | Schmier | G08G 1/123 701/469 |
| 2005/0004757 | A1* | 1/2005 | Neeman | G01C 21/3423 701/414 |

(Continued)

*Primary Examiner* — Bao Long T Nguyen
(74) *Attorney, Agent, or Firm* — Saliwanchik, Lloyd & Eisenschenk

(57) ABSTRACT

Systems and techniques are described to enable the dynamic selection of a transit route through the stop zones of a transit line. Techniques are disclosed for receiving a current location of a transit vehicle on a transit line and determining a transit route through one or more of the vehicle's remaining stop zones by choosing an optimized combination of stop options and route segment options for that specific transit vehicle. Techniques may be performed in some cases by accessing a real-time traffic information service to obtain one or more traffic condition factors on a route segment, determining a dynamic route segment option weight, calculating a dynamic cost function with respect to the weights, and determining an optimized set of the route segments with respect to the cost functions.

20 Claims, 5 Drawing Sheets

(56) References Cited

U.S. PATENT DOCUMENTS

| | | | |
|---|---|---|---|
| 2007/0143012 A1* | 6/2007 | Keaveny | G01C 21/30 340/994 |
| 2008/0154452 A1* | 6/2008 | Kapp | B61L 3/006 701/20 |
| 2011/0034183 A1* | 2/2011 | Haag | G06Q 50/26 455/456.3 |
| 2013/0158846 A1* | 6/2013 | Zhang | G08G 1/127 701/117 |
| 2013/0197794 A1* | 8/2013 | Bast | G01C 21/3423 701/410 |
| 2015/0177011 A1* | 6/2015 | Ibrahimi | G01C 21/3492 701/465 |
| 2015/0294430 A1* | 10/2015 | Huang | G06Q 50/26 705/7.24 |
| 2015/0294566 A1* | 10/2015 | Huang | G05D 1/0261 701/41 |

* cited by examiner

DYNAMIC ROUTING OF TRANSIT VEHICLES

GOVERNMENT SUPPORT

This invention was made with government support under grant number IIS-1213026 awarded by the National Science Foundation. The government has certain rights in the invention.

BACKGROUND

Generally, a transit system is a large-scale public transportation system serving a given area, typically comprising buses, subways, and elevated trains. A transit system usually has numerous transit lines which represent pathways through the given area from a starting point to an ending point through various intermediate stopping points. One or more transit vehicles can service a particular transit line, generally several times a day.

Express transit lines, for example the transit lines serviced by express transit vehicles like express buses, sometimes consist of relatively few stops connected by route segments of significant length. Heavy traffic, lane blockages due to accidents, weather, and other factors can all affect the punctuality and reliability of these express transit vehicles. Despite the availability of current traffic information, generally express transit vehicles follow a fixed path irrespective of traffic conditions, and so riders of express transit vehicles must deal with low reliability/punctuality, and even cancelled trips, in response to conditions that cause longer delays.

BRIEF SUMMARY

Systems and techniques are described to enable the dynamic selection of a transit route through the stop zones of a transit line. The disclosed techniques and systems improve the reliability, punctuality, and level of service of transit vehicles by utilizing available information better.

Embodiments of the subject invention are disclosed for describing a transit line so that each planned stop has a set of alternative stop options, which are connected by sets of route segment options. A planned stop and its alternative stop options form a "stop zone." In case of delays in the vicinity of a planned stop, embodiments of the subject invention can select a local alternative stop which can be reached more easily and can also notify prospective passengers waiting at the stop and passengers already aboard the vehicle.

Embodiments of the subject invention select the most advantageous route segment options by interacting with real-time traffic information systems to obtain an understanding of current and predicted traffic conditions. Thus, transit vehicles do not follow the same route during the execution of every scheduled trip, but can be rerouted in accordance with real-time and predictive traffic data and other dynamic conditions.

In some embodiments, disclosed systems and techniques can select a transit route that skips one or more stop zones if the stop zones cannot be reached without massive delay.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques are described to enable the dynamic selection of a transit route through the stop zones of a transit line.

An embodiment of the subject invention includes techniques for receiving a current location of a transit vehicle on a transit line and determining a transit route through one or more of the vehicle's remaining stop zones by choosing an optimized combination of stop options and route segment options for that specific transit vehicle. Embodiments include accessing a real-time traffic information service to obtain one or more traffic condition factors on a route segment, determining a dynamic route segment option weight, calculating a dynamic cost function with respect to the weights, and determining an optimized set of the route segments with respect to the cost functions.

Certain embodiments of the subject invention include a data store that stores data, metadata, and properties related to one or more transit line, stop zones within a transit line, stop options for a stop zone, and route segment options between a stop option and a subsequent stop option. An embodiment further comprises a stop option weighting factor to indicate the relative desirability of a particular stop option in accordance with one or more preference criteria.

An embodiment of the subject invention further includes techniques for determining whether to skip a stop zone altogether; these embodiments may use one or more skip weighting factors for the determination.

Technical effects of the technical features of embodiments of the subject invention can include improving the reliability and punctuality of transit vehicles. Avoiding unnecessary waits in traffic congestion can save unnecessary energy consumption and in some cases lower emissions and pollution associated with idling transit vehicles.

Figure 1:
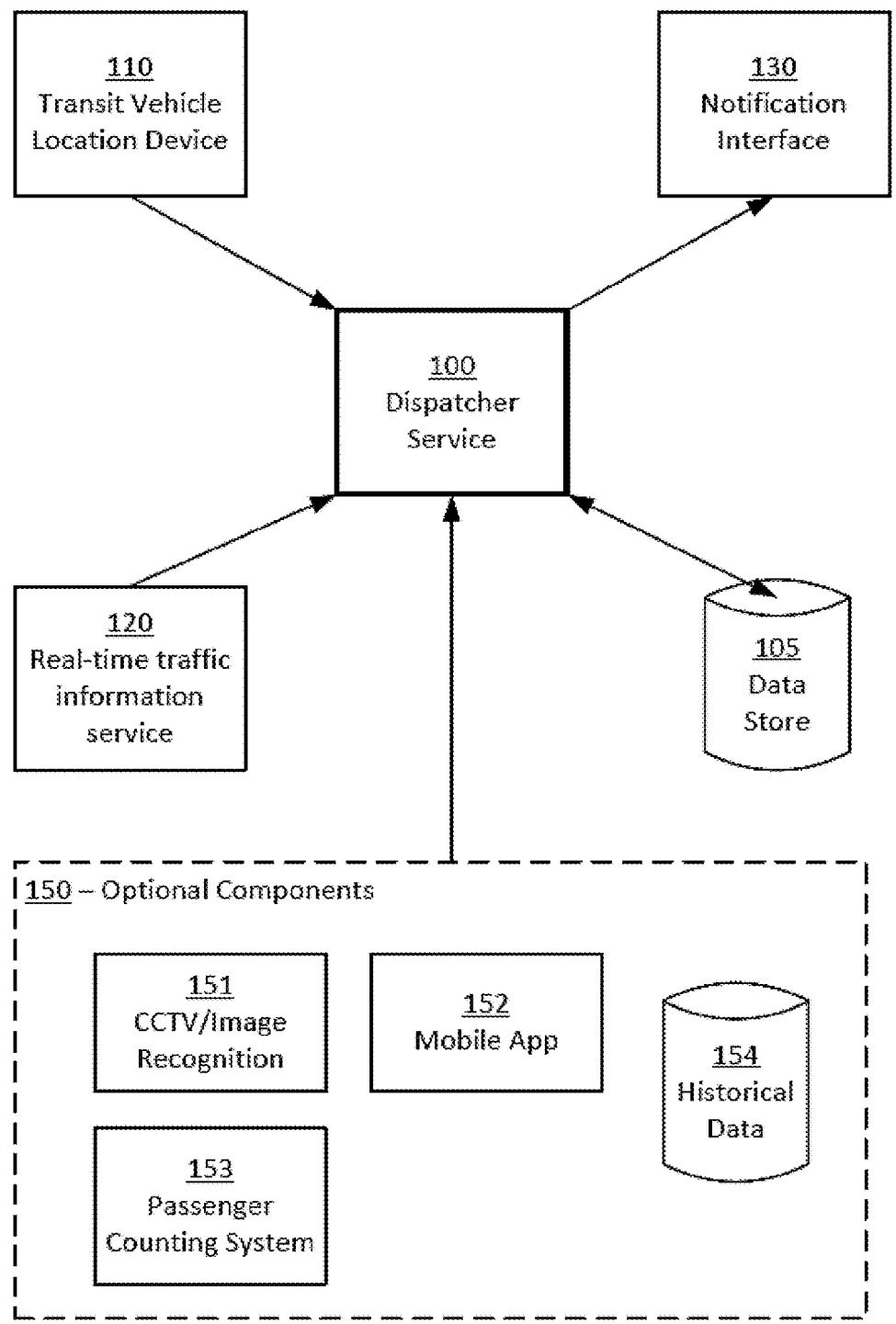
FIG. 1 shows an example component environment for dynamic selection of transit routes.

FIG. 1 shows an example component environment for dynamic selection of transit routes. Generally, a dispatcher service 100 implements techniques in order to dynamically select transit routes that are adaptive to real-time conditions, providing transit vehicle drivers with a way to avoid unnecessary delays that needlessly waste energy or create excess vehicle emissions. In FIG. 1, dispatcher service 100 implements certain techniques in coordination with other system components. Dispatcher service 100 receives input from transit vehicle location devices 110, interacts with real-time traffic information services 120, communicates with notification interface 130 devices that provide notifications to operators and passengers, reads/stores information in the data store 105, and in some cases interfaces with other components 150 to gather information for the selection of transit routes. These and certain other techniques will be described more fully with respect to the process flow in FIG. 3.

Dispatcher service 100 may utilize or interact with a data store 105 that stores a variety of information relating to the operations of the dispatcher service 100. The data store 105 may contain a data structure for storing data, metadata, and/or properties relating to one or more transit lines in a transit system. For each of the transit lines, the data store may contain a sequence of stop zones served by each transit line in the system. A "stop zone" refers to a geographical area, such as a street, block or collection of streets or blocks, that allows the embarking and disembarking of passengers on or from a transit vehicle. The sequence of "stop zones" in a particular transit line may be denoted in some cases herein as $(s_1, s_2, \ldots, s_n)$. For stop zones, the data store may include data, metadata, or properties such as the geolocation of the stop and one or more planned times of arrival. In some cases, the planned times of arrival may be distinctly associated with any combination of: one or more transit lines, one or more transit routes, one or more transit vehicles, and/or days of the week or month (e.g., calendar days, days of week, weekdays vs. weekend days, holidays).

A stop zone on a particular transit line has one or more "stop options." Stop options are different possible places to actually stop in the general locality of the transit line "stop zone." As an example, consider a normal stop on a given transit line that is located at a well-accommodated and well-covered bus kiosk on a main thoroughfare. This normal stop (or "ordinary stop," or "regular stop") is the preferred stop option on this line because it is well-positioned to provide the riders access to several office buildings, shopping, and the ability to catch a variety of local buses. However, the bus is often delayed in arriving at the normal stop option because of lengthy delays due to accidents on the busy main thoroughfare. Thus, it may make sense to have at least one alternative "stop option" that is not on the main thoroughfare but is instead several blocks away on a less-busy street. The alternative stop option can be reached without the lengthy wait times, and may have similar accoutrements to the normal stop. However, more patrons may be inconvenienced by the distance of the alternative stop from their desired arrival point. Several alternative stop options may be available for each stop zone. Generally, the alternative stop options offer sufficiently distinctive access ways to avoid problematic conditions related to the normal stop, but are still close enough to enable passengers to arrive at their destinations in a reasonable time frame. A stop zone's set of local stop options may be denoted herein as $A(s_i)=\{s_{i,0}, s_{i,1}, \ldots, s_{i,m(i)}\}$, where the normal stop option, $s_i=s_{i,0}$.

The data store 105 may also include a plurality of "stop option weighting factors," each of which is associated with a stop option, and describes the relative desirability of the stop option with respect to the normal stop option and the other alternative stop options. A stop option weighting factor may be denoted herein as $w(s_{i,j})$.

The stop option weighting factor can be derived in accordance with a variety of preference criteria which describes the relative desirability of the stop option. A stop option weighting factor can have preference criteria with a combination of static and dynamic aspects. One type of static aspect can be a base numerical value, such as that the normal stop option weighting factor $w(s_{i,0})$, is 1.0, for example. Another type of static aspect can be the walking distance from the alternative stop option to the normal stop.

Another kind of static aspect can quantify the quality of the facilities at the alternative stop (e.g., signage, shelters, raised sidewalks, disabled access, restrooms, and other amenities). Another category of static aspect could include the quality of available pedestrian access to the alternative stop from the normal stop.

Dynamic aspects include a quantification of preference criteria that might relate to temporary or transient factors. For example, the stop option weighting factor might vary in accordance with the season or temperature, e.g., an alternative stop option having a shelter without climate control could have a weighting factor reflecting greater desirability in seasonable times of year such as spring or fall than in winter or summer. Information that may inform a dynamic aspect may be obtained, for example, from weather services, calendar services, or other external information sources.

The stop option weighting factor may be used in techniques implemented by the dispatcher service 100 for determining, in a particular instance, whether the transit route should be adjusted to an alternative stop option. The ratios of the various stop option weighting factors, relative to one another, may assist in the determination of which alternative stop option will be served under which traffic conditions. For example, a higher (or lower) weight than the normal stop option may make it less likely for a stop option to be preferred to the normal stop option, even under heavily adverse conditions.

Figure 2A:
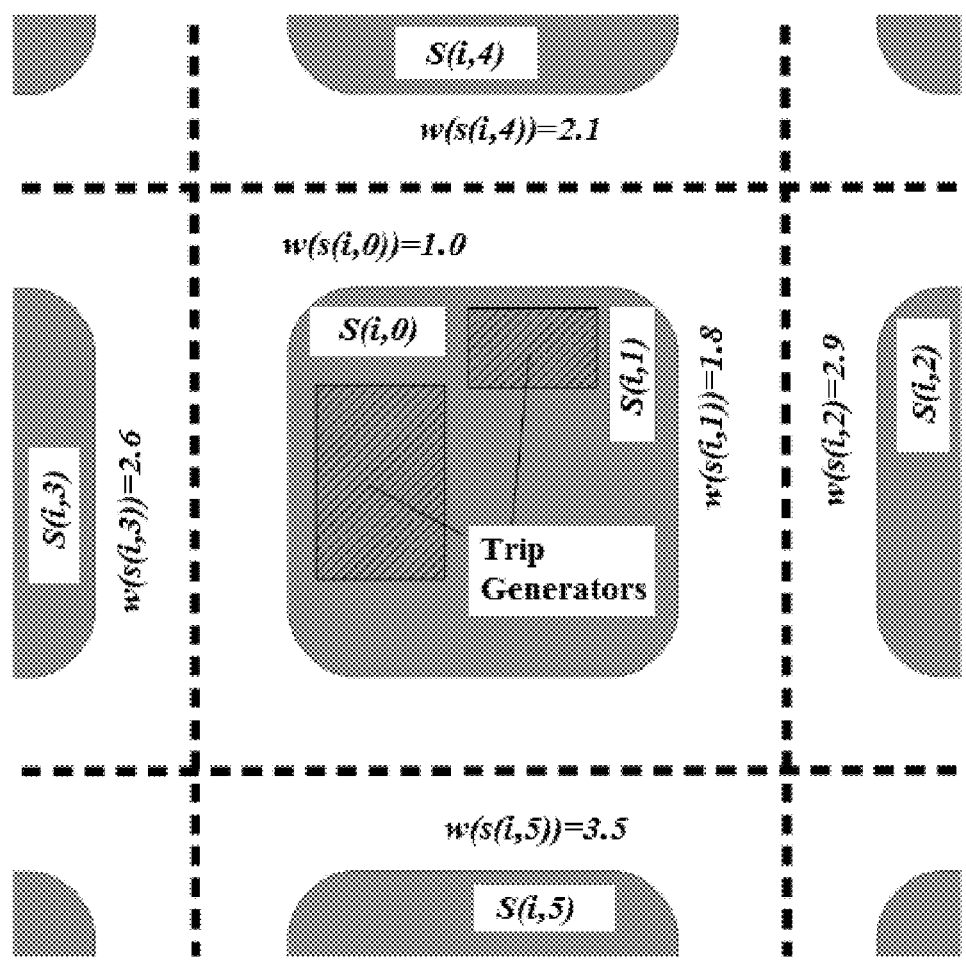
FIG. 2A shows an example of a particular stop zone and associated stop options.

FIG. 2A shows an example of a particular stop zone $s_i$ and its associated stop options, $s(i,0 \ldots 5)$. FIG. 2A shows a typical grid-like stop zone layout with a normal stop option $s_{i,0}$ and several alternative stop options on nearby street-corners and blocks. Also shown in FIG. 2A are stop option weighting factors for each of the stop options.

Returning to FIG. 1, the data store 105 may also include data, metadata, and/or properties describing a plurality of "route segment options." Remembering that each express transit line contains a sequence of stop zones, and each stop zone has a variety of stop options, a route segment option describes a possible route or path between pairs of stop options. Herein, a set of route segment options for a transit line may be denoted as $r(s',s')_j$ between pairs of alternative stops $s' \in A(s_i)$ and $s'' \in A(s_{i+k})$, where $k \geq 1$. In other words, a route segment option connects a given stop option with a subsequent stop option, where the subsequent stop option is not necessarily in the next stop zone. Route segment options may be determined, for example, by interaction with external trip routing services.

Figure 2B:
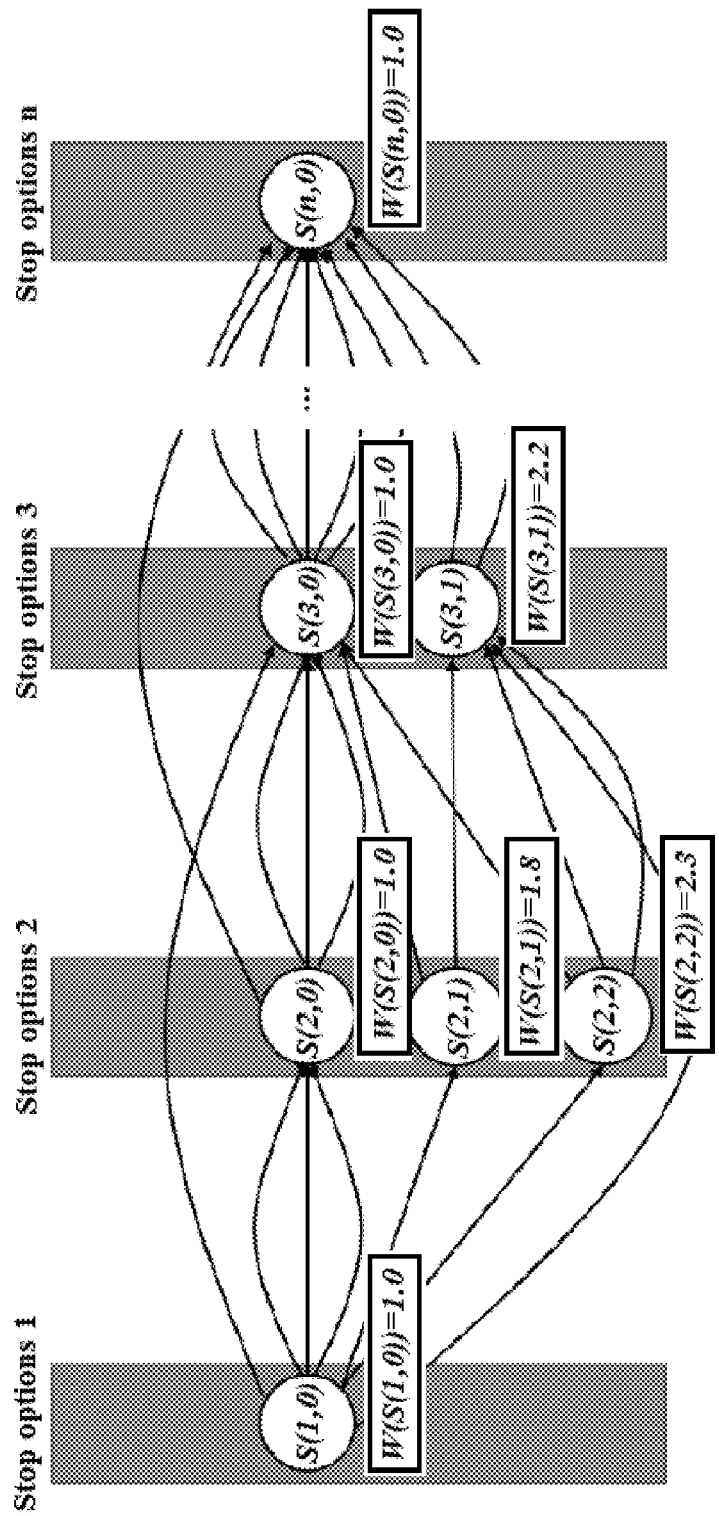
FIG. 2B shows an example of a transit line's stop zones, stop options, and route segment options as a directed, acyclic graph.

FIG. 2B shows an example of a transit line's stop zones, stop options, and route segment options as a directed, acyclic graph. Stop zones for stops 1, 2, 3, and n are indicated as blue bars. Each stop zone has one or more stop options ("nodes," shown as circles), including the "normal" option s(i,0). Each "edge" of the graph (shown as a line) indicates a different path from one stop option to another stop option associated with a subsequent zone. Stop option weighting factors are also shown for each stop option.

Returning to FIG. 1, the dispatcher service 100 may read information persisted on the data store 105 and in some implementations update information on the data store to update the state of the system. Furthermore, examples of data, metadata, and properties are not intended to limit the amount or varieties of data that may be stored by the data store 105. Data store 105 may be implemented as databases, tables, and records in a database management system or relational database management system, examples of which are Microsoft SQL Server® and Oracle®. Data store 105 may also be implemented using NoSQL techniques, XML file structures, or other file structures, as will be appreciated by practitioners in the art.

A transit vehicle location device 110 provides input data that can be transmitted to the dispatcher service to indicate the location of a particular transit vehicle. A transit vehicle location device 110 can include, preferentially, a GPS device placed on a transit vehicle in communication with the dispatcher service 100. In some implementations, a location device 110 can include specialized transit system cameras, sensors, striker plates, or other devices that detect and identify a present or passing transit vehicle at a particular location.

A real-time traffic information service (RTIS) 120 provides the capability to monitor in real-time the traffic and travel conditions on transit ways such as streets, highways, interstates, roads, and rail lines. An RTIS 120 provides data from sensors, cameras, and other devices located on a transit way, usually in an interoperable data exchange format such as DXFS. In some cases, historical and predictive traffic data may be provided. In some cases, an RTIS 120 may be a third party service, such as Google® Maps, that gathers lower-level data from other data providers and integrates the data into more comprehensive services such as navigation.

A notification interface 130 is a device that displays or broadcasts information related to a notification message that some information update about a transit route has occurred. A notification interface 130 could be a dynamic sign, such as an LCD or LED display device visible to the operator and/or to passengers of the particular transit vehicle or of other transit vehicles. A dynamic sign or other type of display device could also be located at a stop option (e.g., on a display screen located in a shelter) to tell passengers about transit routes. An audio or tactile representation of the notification message may be broadcast. A notification interface 130 could also be a mobile device application, such as might be operative on an Android® or iOS® device. The mobile device application might be provided by a third party and be accessible to the dispatcher service 100 via an application programming interface (API). In some cases, the mobile device application might be developed in conjunction with the dispatcher service 100 and be made available to interested patrons. In some cases, a frequent patron may provide his or her mobile number so that the dispatcher service 100 may send the notification message with an SMS message viewable on the patron's mobile phone, which then becomes the notification interface 130.

In certain embodiments of the subject invention, one or more optional components 150 may provide additional real-time or historical input data. The optional components 150 can be used, for example, to gather input that forms part (or all) of a computation of a weighting factor or other dynamically determined factor of the system.

Non-limiting examples of optional components 150 include a system with a closed-circuit television (CCTV) device and associated image recognition software 151. Such a system might be used, for instance, to count the passengers on a transit vehicle or to count the number of passengers waiting at a transit stop zone or stop option.

In some implementations, a driver may use a mobile device application 152 that the dispatcher service 100 can interface with to receive very accurate information about passenger or prospective passenger behavior. The mobile app 152 can provide an interface that allows the passenger to assent to tracking location while on the transit system, for example. The dispatcher service can then know the locations of passengers so better dynamic route selection can be performed. These features can be, but are not necessarily, part of the same mobile application or suite of applications that served as the notification interface 130 for informing the passenger of transit route changes or updates.

Another type of optional component 150 could include a passenger counting system 153. A passenger counting system 153 may be present, for example, at the doors of a transit vehicle so that a current ridership count is known at all times. The passenger counting system may also be present at a stop option, for example at a turnstile on a transit station shelter. This information may be used to estimate the number of passengers that will be inconvenienced by a transit route change, and thus used to adjust dynamic aspects of a weighting factor.

In some cases, an optional component 150 can include a data store of historical data 154. The data in the data store might reflect a historical record of real-time data obtained from other optional components or from other sources. The historical data may be used to predict or estimate, e.g., traffic conditions, traversal times, ridership counts, stop option prospective passenger counts, and passenger behaviors, among other information. In some cases, historical data can include transactional records from prior passenger activities, such as ticket purchases. Any or all of this historical data may be used to adjust dynamic aspects of a weighting factor or other dynamic calculations.

Figure 3:
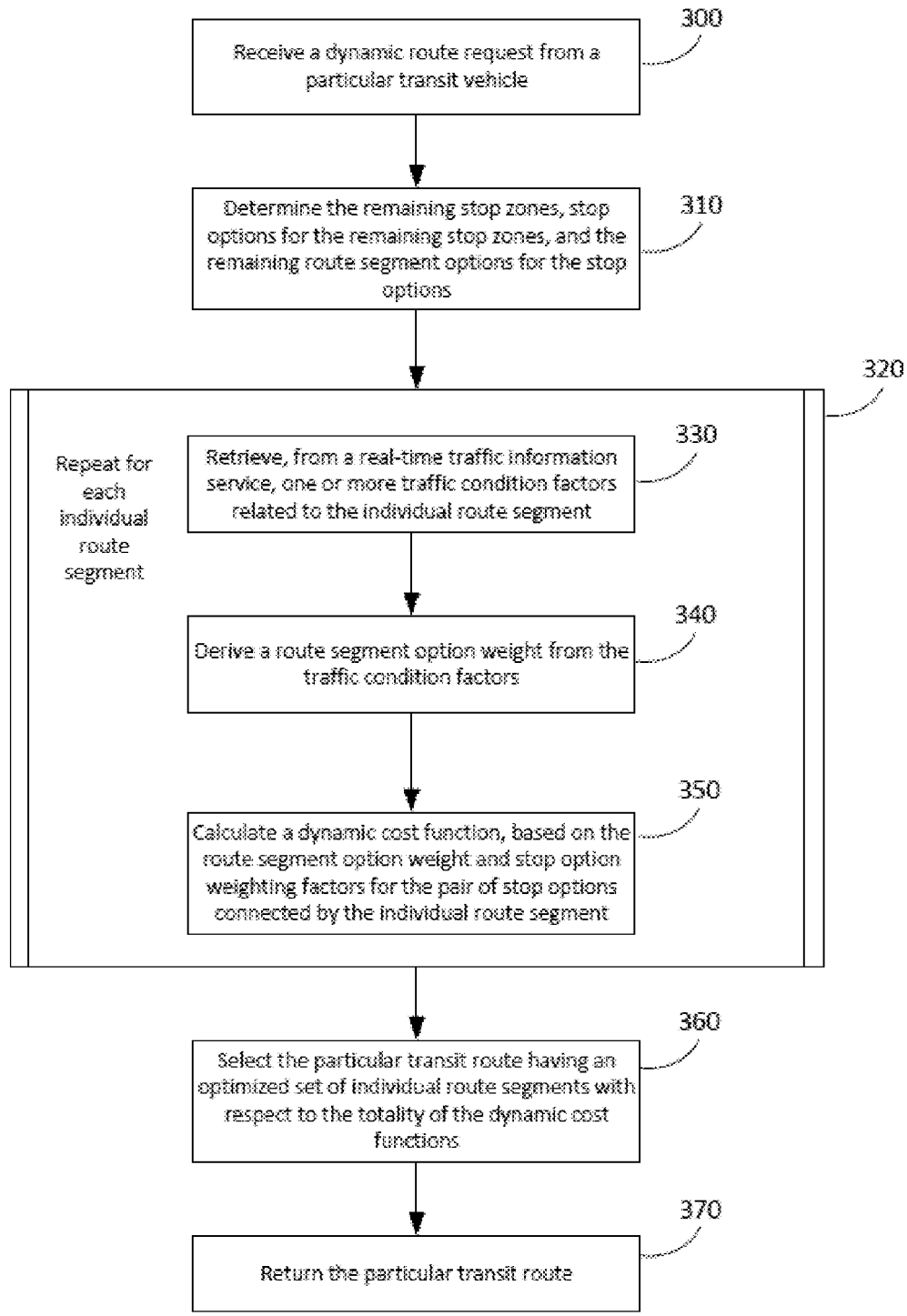
FIG. 3 shows an example process flow for dynamic selection of transit routes.

FIG. 3 shows an example process flow for dynamic selection of transit routes. The process flow in FIG. 3 may be implemented, for example, by a dispatcher service 100 as described in FIG. 1. Generally, FIG. 3 describes a process flow where a transit vehicle provides its current location on a transit line to the dispatcher service, and the dispatcher service determines a transit route through one or more of the vehicle's remaining stop zones by choosing an optimized combination of stop options and route segment options for that specific transit vehicle.

Processing initiates with the receipt of a dynamic route request from a particular transit vehicle (300). A dynamic route request serves as an indication to select and/or recalculate the transit route for one or more remaining stop zones on that particular instance of the transit vehicle's journey. A dynamic route request includes at least the current location of the particular transit vehicle. As noted with respect to FIG. 1, a transit vehicle location device 110, such as a GPS device, may provide the current location. The dynamic route request may be sent, for instance, before the transit vehicle begins a route. The dynamic route request may also be sent, for example, when the transit vehicle reaches a stop zone and updates the dispatcher service 100 with its current location; arrival at one stop zone may indicate to the dispatcher service that computation of a transit route to the remaining stop zones is needed. In some cases, the current location may be sent periodically to the dispatcher service from the transit vehicle location device. When the dispatcher service detects that the current location of the particular transit vehicle is in proximity of a stop zone, or when the dispatcher service determines that an updated transit route is necessary based on current traffic conditions, the dispatcher service may determine and send an updated transit route to the particular transit vehicle. In some implementations, other input information, such as the current ridership of the transit vehicle, may be sent as part of the dynamic route request.

Knowing the current location of a particular transit vehicle allows the dispatcher service to determine the remaining stop zones, stop options for those remaining stop zones, and the remaining route segment options for those stop options (310). The dispatcher service can determine the remaining route segment options by accessing the data store for the data, metadata, and properties associated with the transit line. As noted with respect to FIG. 2B, for example, a characterization of the possible route segment options can be understood as a directed, acyclic graph wherein each edge represents a possible route segment option.

When the remaining route segment options have been enumerated, calculations, determinations, and other operations may be performed with respect to each individual route segment option (320). Generally, these calculations are performed in order to derive a cost function that can be used to select an optimized transit route.

For each individual route segment, the dispatcher service retrieves, from a real-time traffic information service, one or more traffic condition factors related to the individual route segment (330). A real-time traffic information service 120 is described in greater detail in FIG. 1. Since an individual route segment option represents a physical path from point A to B (where A is a stop option associated with one stop zone and B is a stop option associated with a subsequent stop zone on the transit route) through a specific map of streets, highways, byways, trails, etc., the route segment option possesses traffic condition factors that are specific to that particular physical path at that particular time. Traffic condition factors can include, but are not limited to, traffic load at the projected time of usage (e.g., the 5-10 minutes before a busy office building starts work); accidents; special events like lane closures due to construction work, police operations, or games/concerts; expected weather at the projected time of usage; and estimated traversal time from the traffic information service for the projected time of usage.

For that individual route segment e, a route segment option weight v(e,t) can be derived from the traffic condition factors at that specific time t (340). The route segment option weight is a dynamic weight, determined by the dispatcher service in response to the specific, time-based, traffic condition factors. The route segment option weight can be determined in various ways from the traffic condition factors. In some cases, for example, the estimated traversal time of the entire route segment option for the projected time of usage can be compared to the normal traversal time, which can be an element of data/metadata associated with the route segment option description stored in the data store. In some cases, the route segment option weight can include an estimated susceptibility to disruptions (e.g., accidents or congestion) during the projected time of usage. In some cases, the route segment option weight can consider factors such as expected weather or planned events during the projected time of usage.

A dynamic cost function, c(e,t), can be calculated based on the route segment option weight and the stop option weighting factors for the pair of stop options connected by the individual route segment (350). For example, the dynamic cost function can be calculated by multiplying the dynamic route segment option weight v(e,t) by the average of the stop option weighting factors for the two connected stop options $w(s_i)$ and $w(s_{i+k})$, where k≥1, as in the Equation: $c(e,t)=v(e,t)*(w(s_i)+w(s_{i+k}))/2$.

Having computed dynamic cost functions for each individual route segment for the remaining stop zones, the particular transit route (for this particular transit vehicle at this particular time) through the remaining stop zones can be selected by choosing an optimized set of route segment options based on their dynamic cost functions (360).

Choosing the optimized set of route segment options can be accomplished using techniques to calculate a path, optimized with respect to the totality of the dynamic cost functions, through the directed, acyclic graph representing the remaining stop options and route segment options. This can be performed using well-known path finding algorithms or standard combinatorial optimization methods, e.g., a Branch-and-Bound solver, and Mixed Integer Programming and associated refinements. The optimized set can also be determined, in some cases, by complete enumeration of the possible combinations and tabulating the sums of their dynamic cost functions.

The optimized set of route segment options is equivalent to the best choice or routes, based upon traffic condition factors, weighting preferences, and other information. Under normal conditions, all regular/normal stop options are served, but are connected by dynamically calculated route segments. An alternative stop option will be preferred to a regular stop option when this represents an advantage that ameliorates anticipated delays without an excess of inconvenience factors. The particular transit route selected may then be returned to the particular transit vehicle (370).

In some embodiments, the dispatcher service may send a notification message to be displayed on an available notification interface 130, as described in FIG. 1. The notification message can include the particular transit route selected, or one or more aspects thereof, to an operator (e.g., bus driver) of the particular transit vehicles and/or to the operators of other transit vehicles. The notification message allows the operator to adjust the path of the transit vehicle to a new or updated transit route. The notification message can also communicate such information as stop option, stop zone, and route segment changes to patrons, e.g., passengers riding the transit vehicle or those waiting for the transit vehicle to arrive at a particular stop option. The notification messages may allow the patrons to adjust their schedules and move to a different stop option from the normal or expected stop option, etc. Naturally, a notification message could be issued to multiple notification interfaces simultaneously, in cases where multiple interfaces are available. The notification message can differ in content and detail of information, as well as frequency of update, depending on the notification interface on which it is displayed and for whom the notification message is intended.

Under some conditions, dynamically selecting route segment options and local stop options is not enough to avoid severe transit vehicle delays. Some embodiments include techniques for facilitating the skipping of one or more stop zones. "Skipping" a stop zone refers to not stopping at any of the stop options of the stop zone. For example, if a normal transit line's path takes a transit vehicle from stop zone A to stop zone B to stop zone C, each with several stop options, an alternate transit route where a stop zone is skipped might notify the transit vehicle to go directly from stop zone A to stop zone C. Naturally, skipping a stop zone can be disruptive to riding passengers as well as patrons to be picked up at a stop option.

Embodiments having techniques and systems for determining whether a stop zone should be skipped can include additional weighting factors stored in the data store. In one embodiment supporting skipped stop zones, a stop zone $(s_i)$ may be skipped when the estimated traversal time for the best possible set of route segment options from the preceding stop zone $s_{i-1}$ to $s_i$ and then on to the next stop zone $s_{i+1}$ is greater than the originally planned travel time for the same path, multiplied by a weighting factor, $y(s_i)>1$. The originally planned travel time may be obtained, in some cases, by accessing the data store for stop zone to stop zone travel time information. The estimated traversal time may be computed from information or traffic condition factors obtained from a real-time traffic information service.

In an embodiment supporting skipped stop zones, a stop zone ($s_i$) may be skipped when the estimated traversal time for the best possible set of route segment options from the preceding stop zone $s_{i-1}$ to $s_i$ and then on to the next stop zone $s_{i+1}$ is greater than the estimated traversal time for the best possible set of route segment options without serving stop $s_i$, ($s_{i-1}$, $s_{i+1}$), multiplied by a weighting factor $u(s_i) > 1$.

When it is determined that a stop zone should be skipped, estimated travel times for route segment options from $s_{i-1}$ to $s_{i+1}$ are calculated. In some cases, multiple succeeding stop zones may be skipped to find an acceptable transit path. In some cases, no acceptable transit path is acceptable and the remainder of the trip may be cancelled.

In some implementations, the weighting factors y and u are static weighting factors. Sometimes, the weighting factors y and u can have different values for each stop zone. In some cases, each of the weighting factors y and u can have a single value for every stop zone in the transit system or a particular transit line (i.e., there is a single value for y and for u, transit-line-wide or transit-system-wide).

In certain embodiments, a dynamic aspect of a weighting factor, e.g., w, y and u, may be influenced by real-time and/or historical data, and/or predictions or estimations made from real-time/historical data. In such embodiments, weighting factors w, y and u may be dynamically computed based on the dynamic aspect, input data for which may be gathered from sensors or devices constituting real-time input. In some cases, the sensors or devices may be a type of optional component 150. Sometimes, the real-time input may be received from the dispatcher service as additional information sent as part of the dynamic route request.

In some cases, the input may be taken from historical data recorded from such real-time sensors or devices. Historical data may be in part formed from the real-time data that has been stored in the data store for a period of time. In some cases, predictions may be made which are based on the real-time input and/or historical data.

Some of the data may reflect the behavior of passengers, and some of the predictions and/or estimations made from historical data may be related to passenger activities.

In some cases, the data includes the total number of passengers aboard the transit vehicle. The number of passengers could be counted, e.g., by an entry/exit door counter, by a device including a camera and pattern recognition software, or by predicting/estimating the information from crowd-sourced data.

In some cases, the data includes the number of passengers on the transit vehicle that want to disembark at a certain stop zone. This data might be used, for instance, to dynamically adjust the y or u weighting factor for a stop zone. This information might be obtained, for example, by information obtained from ticket reading or ticket-purchasing devices, or by predicting/estimating the information from crowd-sourced data.

Sometimes, the data includes the number of passengers waiting at a particular stop option for a transit vehicle to arrive. This data might be used, for instance, to dynamically adjust the stop option weighting factor (w) for the stop option or to influence the y or u weighting factor for a stop zone. The number of passengers waiting could be counted, e.g., by a turnstile counting device attached to the associated transit shelter, by a device including a camera and pattern recognition software, or by predicting/estimating the information from crowd-sourced data.

In certain cases, the data includes the estimated number of prospective passengers heading for a certain transit stop zone or stop option. This data might be used, for instance, to dynamically adjust the stop option weighting factor (w) for the stop option or to influence the y or u weighting factor for a stop zone. The estimate of prospective passengers can be determined, e.g., by evaluating behavioral patterns or geo-location data collected by mobile device applications, obtaining from a ticket sales system the number of tickets sold in advance, by evaluating historical data, or by predicting/estimating the information from crowd-sourced data.

Sometimes, the data includes the estimated time passengers will wait at a certain stop option to be collected by a subsequent or succeeding transit vehicle. This data might be used, for instance, to dynamically adjust the y or u weighting factor used to determine whether a stop should be skipped. The estimated time for a succeeding vehicle may be determined, e.g., by interacting with a real-time traffic information service.

Understanding of the functioning of certain embodiments of the subject invention may be enhanced with the following example, which is illustrative and not intended to be limiting.

In this example, the transit vehicle is an express bus. The express bus is assigned to serve a sequence of stops ($s_1, s_2, \ldots, s_n$), starting its circulation at 6.00 am. The bus is equipped with a GPS receiver, a tablet computer installed next to the driver's seat, and a cellular two-way connection to a central server where the dispatcher service and data store reside. As noted, the data store has the pre-computed route segment options and local stop options, and the dispatcher service receives and analyses the bus' GPS data, collects real-time traffic information and predicts future traffic conditions, and utilizes all this data to recommend best possible routes to the vehicle.

At 6:00 am the express bus is ready to leave the depot and to execute its first scheduled trip. As no major congestion is predicted over the course of the trip, the dispatcher service decides on serving the regular stop options, as scheduled, by utilizing the route segments with the shortest estimated traversal time.

After leaving the depot, the vehicle proceeds to the first regular Stop $s_1$ and lets passengers board. The dispatcher service recognizes the stop by comparing the bus' assigned sequence of stops with the vehicle's GPS data. There are four pre-computed route segment alternatives connecting $s_1$ and stop options in $A(s_2)$, which consists of two options. As there are no current reports about any heavy traffic in the area, the system decides to serve the normal stop option, $s_{2,0}$, selects the route segment option with the shortest expected travel time, and transmits it to the vehicle's computer. It gets displayed to the driver, who then follows it.

At 8:30 am, the bus pulls into Stop $s_i$. The system recognizes this by comparing GPS data to the known position of bus stops the vehicle has to serve. The dispatcher service iterates through $A(s_{i+1})$ and the pre-computed route segment alternatives, and then calculates route segment option weights and dynamic cost functions according to traffic reports. As most major arteries around $s_{i+1,0}$ are congested by rush-hour traffic, the system elects to serve stop option $s_{i+1,2}$, and chooses a non-obvious route segment which includes a significant detour. This route update is transmitted to the vehicle and displayed to the driver, who then embarks on the trip. The trip to the next stop $s_{i+1,2}$ takes longer than originally scheduled, and also inconveniences passengers who plan to embark or disembark at the regular stop. However, it is the most efficient option considering the current traffic conditions. Notification messages are sent out for display to passengers of the bus and potential riders.

At 8:45 am, the express bus stops at Stop $s_j$. By now the area is completely congested due to an accident, and the dispatcher service estimates a travel time to the best stop option in $A(s_{j+1})$ of 45 minutes instead of the scheduled 5 minutes, and from there to the best option in $A(s_{j+2})$ of 30 minutes instead of the scheduled 5 minutes. If $A(s_{j+1})$ were to be skipped, the bus could avoid the congested area, and an estimated travel time to $A(s_{j+2})$ of 15 minutes instead of the scheduled 10 minutes could be achieved. Based on these estimations the algorithm decides to skip $s_{j+1}$ and sends the vehicle directly from $s_j$ to $A(s_{j+2})$. Notification messages are sent out for display to passengers of the bus and potential riders; the messages may include re-routing suggestions and/or instructions for obtaining compensation.

At 11:00 am, the bus pulls into Stop $s_k$, recognized again by comparing the vehicle's GPS data to the known stop positions. Real-time traffic information shows no heavy traffic on the shortest route segment option to $s_{k+1,0}$, but congestion is foreseen to be developing in ten minutes time. The system therefore selects another route segment alternative, which includes a slight detour. The route update is transmitted to the on-board computer and displayed to the driver, who can thus avoid the developing congestion.

Figure 4:
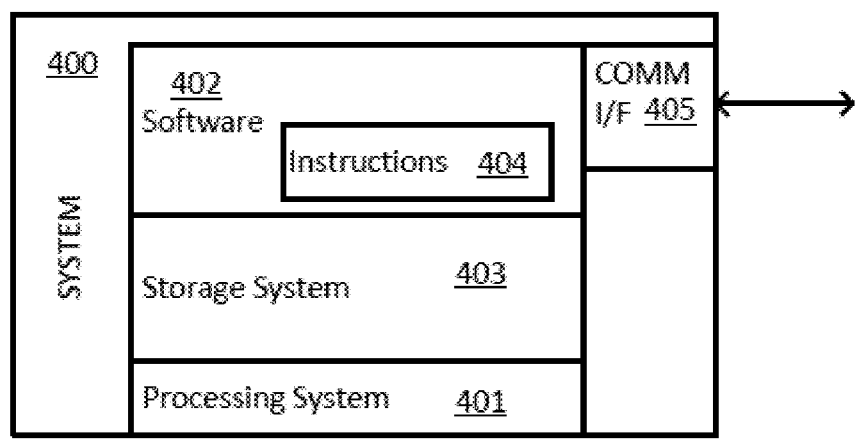
FIG. 4 shows a block diagram illustrating components of a computing device or system used in some implementations.

FIG. 4 shows a block diagram illustrating components of a computing device or system used in some implementations of the described dispatcher service, data store, notification interface, or mobile app. For example, any computing device operative to run a dispatcher service 100, or intermediate devices facilitating interaction between other devices in the environment, may each be implemented as described with respect to system 400, which can itself include one or more computing devices. The system 400 can include one or more blade server devices, standalone server devices, personal computers, routers, hubs, switches, bridges, firewall devices, intrusion detection devices, mainframe computers, network-attached storage devices, and other types of computing devices. The hardware can be configured according to any suitable computer architectures such as a Symmetric Multi-Processing (SMP) architecture or a Non-Uniform Memory Access (NUMA) architecture.

The system 400 can include a processing system 401, which may include a processing device such as a central processing unit (CPU) or microprocessor and other circuitry that retrieves and executes software 402 from storage system 403. Processing system 401 may be implemented within a single processing device but may also be distributed across multiple processing devices or sub-systems that cooperate in executing program instructions.

Examples of processing system 401 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 403 may comprise any computer readable storage media readable by processing system 401 and capable of storing software 402 including, e.g., dispatcher service 100, data store 105, instructions for a notification interface 130, historical data store 154, and mobile app 152. Storage system 403 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 403 may also include communication media over which software 402 may be communicated internally or externally.

Storage system 403 may be implemented as a single storage device but may also be implemented across multiple storage devices or sub-systems co-located or distributed relative to each other. Storage system 403 may include additional elements, such as a controller, capable of communicating with processing system 401.

Software 402 may be implemented in program instructions and, among other functions, may, when executed by system 400 in general or processing system 401 in particular, direct system 400 or processing system 401 to operate as described herein for enabling dynamic selection of transit routes. Software 402 may provide program instructions 404 that implement a dispatcher service 100, data store 105, notification interface 130, or mobile app 154. Software 402 may implement on system 400 components, programs, agents, or layers that implement in machine-readable processing instructions the methods described herein as performed by dispatcher service 100 (as instructions 404).

Software 402 may also include additional processes, programs, or components, such as operating system software, other application software, and software for interfacing with vehicle location devices 110, RTIS 120, notification interface 130, CCTV systems 151, mobile apps 152, passenger counting system 153, or a historical data store 154. Software 402 may also include firmware or some other form of machine-readable processing instructions executable by processing system 401.

Dispatcher service 100 may communicate with other devices, external components, and system components in some cases using an application programming interface (API). An API is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture.

In general, software 402 may, when loaded into processing system 401 and executed, transform system 400 overall from a general-purpose computing system into a special-purpose computing system customized to facilitate dynamic selection of transit routes. Indeed, encoding software 402 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage.

System 400 may represent any computing system on which software 402 may be staged and from where software 402 may be distributed, transported, downloaded, or otherwise provided to yet another computing system for deployment and execution, or yet additional distribution.

In embodiments where the system 400 includes multiple computing devices, one or more communications networks may be used to facilitate communication among the computing devices. For example, the one or more communications networks can include a local, wide area, or ad hoc network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 405 may be included, providing communication connections and devices that allow for communication between system 400 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of system 400 may be included in a system-on-a-chip (SoC) device. These elements may include, but are not limited to, the processing system 401, a communications interface 405, and even elements of the storage system 403 and software 402.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for dynamic selection of transit routes, the system comprising:
   a) one or more non-transitory computer readable storage media;
   b) a data store contained on the one or more non-transitory computer readable storage media comprising one or more data structures related to:
      b-1) one or more transit lines in a transit system;
      b-2) a plurality of stop zones served by each of the one or more transit lines;
      b-3) one or more stop options associated with each of the plurality of stop zones;
      b-4) a plurality of stop option weighting factors, each stop option weighting factor describing a relative desirability of a particular stop option in accordance with one or more preference criteria; and
      b-5) a plurality of route segment options, each route segment option describing a path between a first stop option and a subsequent stop option; and
   c) program instructions for a dispatching service stored on the one or more non-transitory computer readable storage media, when executed by a processing system, the program instructions direct the processing system to:
   in response to receiving a dynamic route request, the dynamic route request comprising a current location of a particular transit vehicle on a particular transit line and the current location being obtained from a transit vehicle location device, determine a particular transit route from the current location of the particular transit vehicle through one or more remaining s$_t$op zones of the particular transit line by:
      c-1) determining one or more remaining route segment options based on the one or more remaining stop zones and the plurality of route segment options in the data store;
      c-2) for each individual route segment of the one or more remaining route segment options:
         c-2a) to retrieve, from a real-time traffic information service, one or more traffic condition factors related to the individual route segment;
         c-2b) to determine, from the one or more traffic condition factors, a route segment option weight; and
         c-2c) to calculate a dynamic cost function based on the route segment option weight for the individual route segment, and particular stop option weighting factors for the one or more stop options connected by the individual route segment;
      c-3) selecting the particular transit route, the particular transit route being comprised of an optimized set of individual route segments with respect to a totality of dynamic cost functions; and
      c-4) returning the particular transit route to the particular transit vehicle.

2. The system of claim 1, wherein selecting the particular transit route comprises:
   determining an estimated traversal time for a best possible set of route segment options from a preceding stop zone ($s_{i-1}$) to a specific stop zone ($s_i$) and on to a next stop zone ($s_{i+1}$); and when the estimated traversal time is greater than an originally planned traversal time between $s_{i-1}$ and $s_{i+1}$ multiplied by a selected first skip weighting factor, the selected first skip weighting factor being greater than one, determining the optimized set of individual route segments by skipping the specific stop zone $s_i$ and proceeding directly from $s_{i-1}$ to $s_{i+1}$.

3. The system of claim 2, wherein the data store further comprises one or more properties related to a plurality of first skip weighting factors, each of the plurality of first skip weighting factors relating to an associated stop zone, and the selected first skip weighting factor being the one of the plurality of first skip weighting factors associated with the specific stop zone.

4. The system of claim 1, wherein selecting the particular transit route comprises:
 determining a first estimated traversal time for the best possible set of route segment options from a preceding stop zone ($s_{i-1}$) to a specific stop zone ($s_i$) and on to a next stop zone ($s_{i+1}$); and
 when the first estimated traversal time is greater than a second estimated traversal time for the best possible set of route segment options between the preceding stop zone ($s_{i-1}$) and the next stop zone ($s_{i+1}$) multiplied by a selected second skip weighting factor, the selected second skip weighting factor being greater than one, determining the optimized set of individual route segments by skipping the specific stop zone $s_i$ and proceeding directly from $s_{i-1}$ to $s_{i+1}$.

5. The system of claim 4, wherein the data store further comprises one or more properties related to a plurality of second skip weighting factors, each of the plurality of second skip weighting factors relating to an associated stop zone, and the selected second skip weighting factor being the one of the plurality of second skip weighting factors associated with the specific stop zone.

6. The system of claim 1, further comprising program instructions that, when executed by the processing system, direct the processing system to:
 send one or more notification messages to one or more notification interfaces.

7. The system of claim 6, wherein the one or more notification messages comprise information describing one or more of:
 the particular transit route;
 a delay in arrival time at a stop zone;
 a change in a selected stop option; and
 a selected route segment option.

8. The system of claim 1, wherein a dynamic aspect of a weighting factor comprises one or more of:
 a first count of passengers on the particular transit vehicle;
 a second count of passengers who are planning to disembark at a given stop zone;
 a third count of passengers waiting at a particular stop option for the particular transit vehicle to arrive;
 an estimated number of prospective passengers heading for a certain stop zone or stop option; and
 an estimated wait time passengers will wait at a certain stop option to be collected by a subsequent transit vehicle.

9. The system of claim 8, wherein an input to the dynamic aspect is obtained in real-time from the real-time traffic information service, an optional component, or estimated from historical data.

10. The system of claim 1, wherein the one or more preference criteria of a stop option weighting factor comprise one or more of:

a walking distance from an associated stop option to a normal stop option;
an available pedestrian access from the normal stop option to the associated stop option; and
a quality of facilities at the associated stop option.

11. The system of claim 1, wherein the route segment option weight is computed from input data, wherein the input data relates to the individual route segment for a projected time of usage, the input data comprising one or more of:
 an estimated traversal time;
 an estimated susceptibility to disruptions;
 a traffic load;
 a current or predicted delay;
 a special event; and
 a weather forecast.

12. A method for dynamic selection of transit routes, the method comprising:
 a) receiving a dynamic route request, the dynamic route request comprising a current location of a particular transit vehicle on a particular transit line, the current location being obtained from a transit vehicle location device;
 b) determining a particular transit route from the current location of the particular transit vehicle through one or more remaining stop zones of the particular transit line by:
  b-1) determining one or more remaining route segment options based on the one or more remaining stop zones and a plurality of route segment options;
  b-2) for each individual route segment of the one or more remaining route segment options:
   b-2a) to retrieve, from a real-time traffic information service, one or more traffic condition factors related to the individual route segment;
   b-2b) to determine, from the one or more traffic condition factors, a route segment option weight; and
   b-2c) to calculate a dynamic cost function based on:
    b-2c(i)) the route segment option weight for the individual route segment, and
    b-2c(ii)) stop option weighting factors for stop options connected by the individual route segment; and
   b-2d) selecting the particular transit route, the particular transit route being comprised of an optimized set of individual route segments, the optimized set of individual route segments being optimized with respect to a totality of dynamic cost functions; and
 c) returning the particular transit route to the particular transit vehicle.

13. The method of claim 12, wherein selecting the particular transit route comprises:
 determining an estimated traversal time for a best possible set of route segment options from a preceding stop zone ($s_{i-1}$) to a specific stop zone ($s_i$) and on to a next stop zone ($s_{i+1}$); and
 when the estimated traversal time is greater than an originally planned traversal time between $s_{i-1}$ and $s_{i+1}$ multiplied by a selected first skip weighting factor, wherein the selected first skip weighting factor is greater than one, determining the optimized set of individual route segments by skipping the specific stop zone $s_i$ and proceeding directly from $s_{i-1}$ to $s_{i+1}$.

14. The method of claim 12, wherein selecting the particular transit route comprises:

determining a first estimated traversal time for the best possible set of route segment options from a preceding stop zone ($s_{i-1}$) to a specific stop zone ($s_i$) and on to a next stop zone ($s_{i+1}$); and when the first estimated traversal time is greater than a second estimated traversal time for the best possible set of route segment options between the preceding stop zone ($s_{i-1}$) and the next stop zone ($s_{i+1}$) multiplied by a selected second skip weighting factor, wherein the selected second skip weighting factor is greater than one, determining the optimized set of individual route segments by skipping the specific stop zone $s_i$ and proceeding directly from $s_{i-1}$ to $s_{i+1}$.

15. The method of claim 12, further comprising:
sending one or more notification messages to one or more notification interfaces.

16. The method of claim 15, wherein the one or more notification messages comprise information describing one or more of:
the particular transit route;
a delay in arrival time at a stop zone;
a change in a selected stop option; and
a selected route segment option.

17. The method of claim 12, wherein a dynamic aspect of a weighting factor comprises one or more of:
a first count of passengers on the particular transit vehicle;
a second count of passengers who are planning to disembark at a given stop zone;
a third count of passengers waiting at a particular stop option for the particular transit vehicle to arrive;
an estimated number of prospective passengers heading for a certain stop zone or stop option; and
an estimated wait time passengers will wait at a certain stop option to be collected by a subsequent transit vehicle.

18. The method of claim 17, wherein an input to the dynamic aspect is obtained in real-time from the real-time traffic information service, an optional component, or estimated from historical data.

19. The method of claim 12, wherein a stop option weighting factor comprises one or more preference criteria selected from the group consisting of:
a walking distance from an associated stop option to a normal stop option;
an available pedestrian access from the normal stop option to the associated stop option; and
a quality of facilities at the associated stop option.

20. The method of claim 12, wherein the route segment option weight is computed from input data, and wherein the input data relates to the individual route segment for a projected time of usage, the input data comprising one or more of:
an estimated traversal time;
an estimated susceptibility to disruptions;
a traffic load;
a current or predicted delay;
a special event; and
a weather forecast.

* * * * *